Feb. 16, 1937. J. R. STEPHENSON 2,070,629
REFRIGERATOR CONDENSER
Original Filed Feb. 13, 1933 6 Sheets-Sheet 1

Inventor
James R. Stephenson
By Spencer Hardman & Fehr
Attorneys

Feb. 16, 1937.  J. R. STEPHENSON  2,070,629
REFRIGERATOR CONDENSER
Original Filed Feb. 13, 1933   6 Sheets-Sheet 2

Inventor
James R. Stephenson
By Spencer Hardman and Fehr
Attorneys

Feb. 16, 1937.  J. R. STEPHENSON  2,070,629
REFRIGERATOR CONDENSER
Original Filed Feb. 13, 1933   6 Sheets-Sheet 3
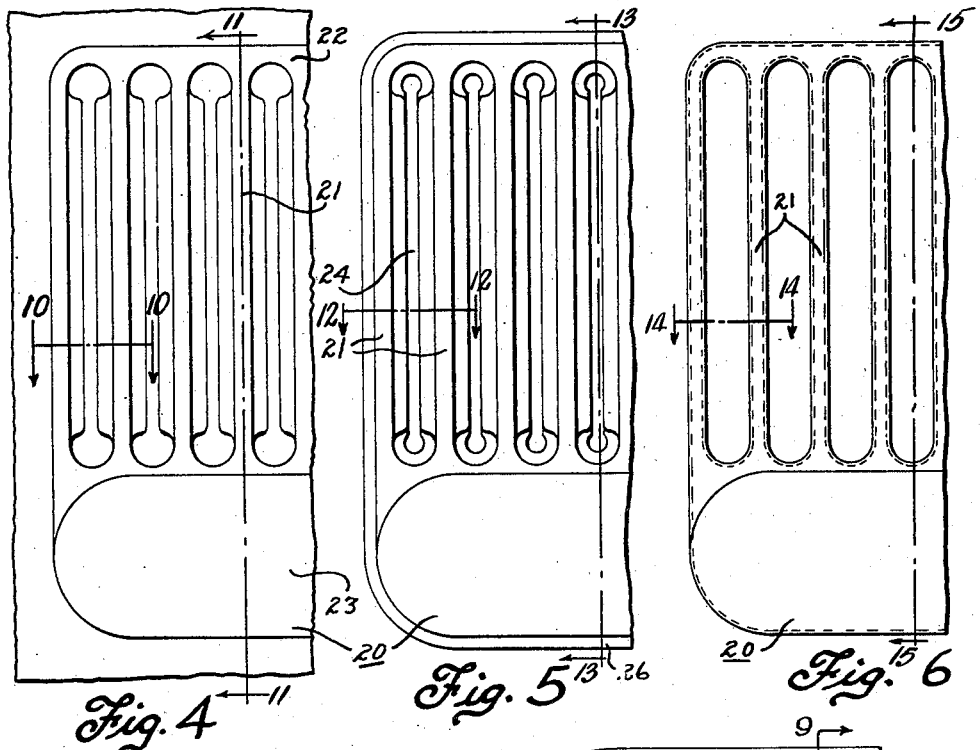
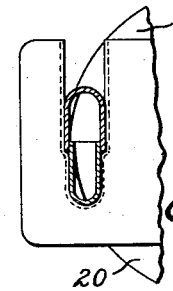
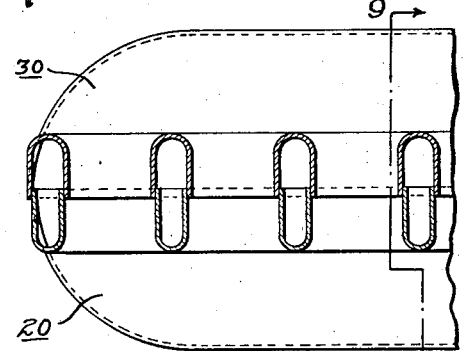
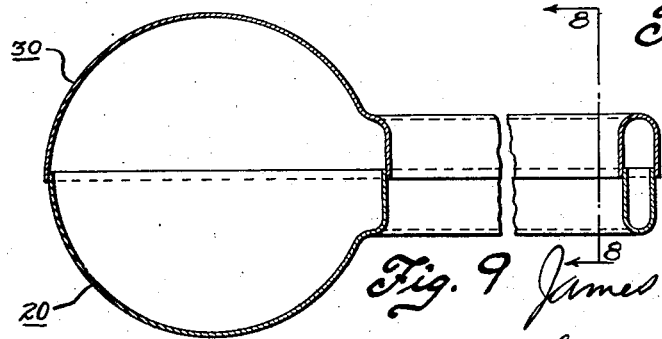
Inventor
James R. Stephenson
By Spencer Hardman & Fehr
Attorneys Feb. 16, 1937. J. R. STEPHENSON 2,070,629
REFRIGERATOR CONDENSER
Original Filed Feb. 13, 1933 6 Sheets-Sheet 5

Inventor
James R. Stephenson
By Spencer Hardman and Fehr
Attorneys

Feb. 16, 1937. J. R. STEPHENSON 2,070,629
REFRIGERATOR CONDENSER
Original Filed Feb. 13, 1933 6 Sheets-Sheet 6

Inventor
James R. Stephenson
By Spencer Hardman and Fehr
Attorneys

Patented Feb. 16, 1937

2,070,629

UNITED STATES PATENT OFFICE 2,070,629

REFRIGERATOR CONDENSER

James R. Stephenson, Dayton, Ohio, assignor, by mesne assignments, to General Motors Corporation, a corporation of Delaware Application February 13, 1933, Serial No. 656,464
Renewed May 18, 1936

15 Claims. (Cl. 257—36)

This invention relates to refrigerating apparatus and more particularly to that form of heat transfer apparatus used in the refrigerating system which is ordinarily called a condenser.

In a particular type of refrigerating system which is popularly known as the high side float system, there is provided, in addition to the compressor and evaporator, a condenser and a float chamber connected to the condenser containing a float controlled valve ordinarily called a high side float. In order to secure accurate control of the refrigerant by the high side float, it is desirable to make this float chamber of a rather small capacity in proportion to the amount of liquid refrigerant in the system. This high side float is often provided with some form of means which enables the float valve to be shut off so that a portion of the system may be repaired. When the low side of the system is being repaired, that is, the evaporator side, it is desirable to remove substantially all of the liquid and vapor from this portion of the system. In order to do this, the compressor unit is run until as much refrigerant as possible is transferred and condensed in the high side portion of the refrigerating system. In order to do this I have found it very desirable to provide a storage chamber within the condenser.

Heretofore most condensers have been manufactured from tubing which is bent into serpentine shape and provided with cross fins. In order to provide a capacity chamber in such a condenser, it is necessary to add a chamber below the condenser. I have found that the cost of such a condenser and chamber is rather high and it is therefore an object of my invention to provide a unitary condenser structure provided with a capacity chamber.

It is another object of my invention to provide a condenser structure from two sheets of metal which are formed to shape and bonded together to provide a unitary tubular condenser throughout.

It is a more specific object of my invention to provide an integral condenser structure of two sheets of metal shaped and bonded together to provide a plurality of parallel duct means connected at their end portions by headers.

In the manufacture of this type of heat transfer apparatus, I have found it desirable to first form the two sheets of metal to the proper shape and then to telescope the two members together and provide the tubular members with cross fins, after which the fins and the two sheets of metal are all bonded together at the same time.

Further objects and advantages of the present invention will be apparent from the following description, reference being had to the accompanying drawings, wherein a preferred form of the present invention is clearly shown.

In the drawings:

Fig. 4 is a view showing a portion of one of the sheets after the first drawing operation;

Fig. 5 is a fragmentary view of the same sheet after a piercing operation following the first drawing operation;

Fig. 6 is a view showing the same sheet of metal after the final drawing operation following the piercing and the first drawing operations;

Fig. 7 is a fragmentary sectional view of a portion of one of the parallel vertical tubular end members shown in Fig. 1, and is taken on line 2—2 of Fig. 1;

Fig. 8 is a sectional view on line 8—8 of Fig. 9 through a plurality of vertical tubular members shown in Fig. 1;

Fig. 9 is a sectional view on line 9—9 of Fig. 8 through the upper and lower header portions of the condenser shown in Fig. 1 but without the fins;

Figure 2:
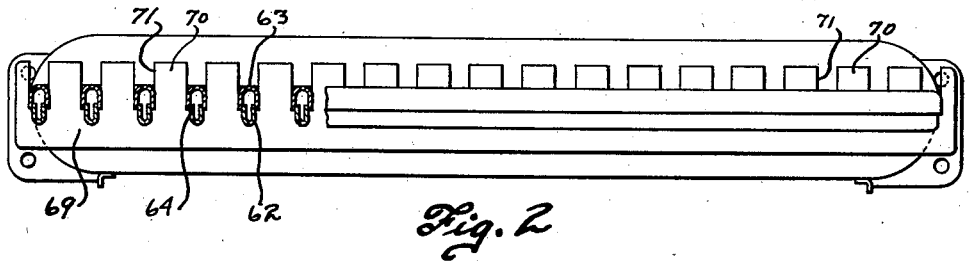
Fig. 2 is a top view of my improved condenser structure, partly in section on line 2—2 of Fig. 1.
Figure 1:
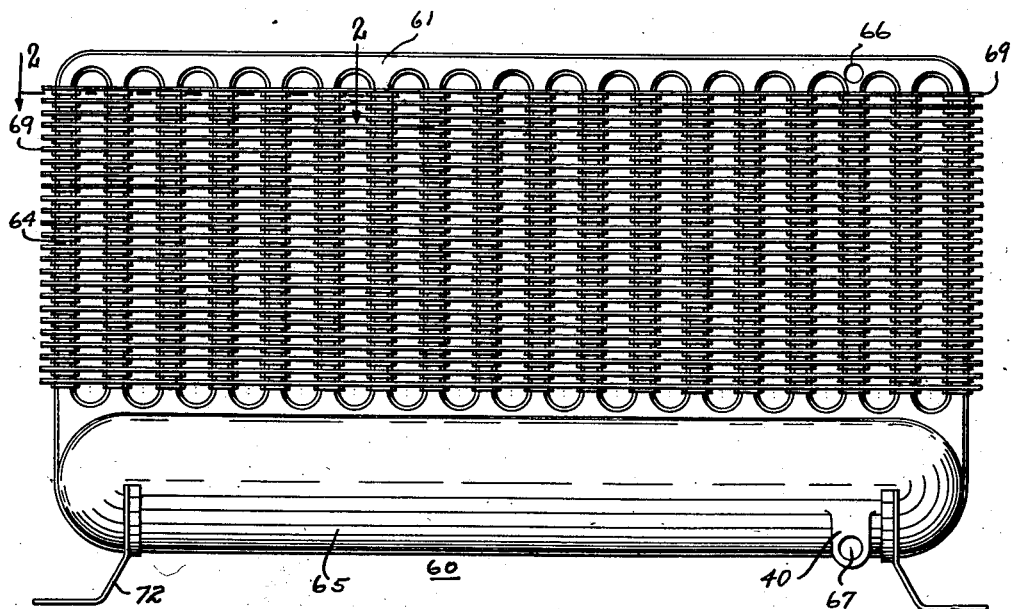
Fig. 1 is a front view of an improved condenser embodying my invention.
Figure 10:
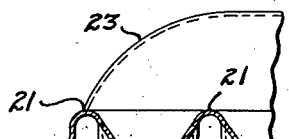
Fig. 10 is a fragmentary cross sectional view of a portion of the sheet on line 10—10 of Fig. 4.
Figure 11:
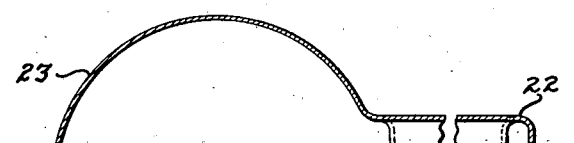
Fig. 11 is a fragmentary vertical sectional view of a portion of the sheet on line 11—11 of Fig. 4.
Figure 20:
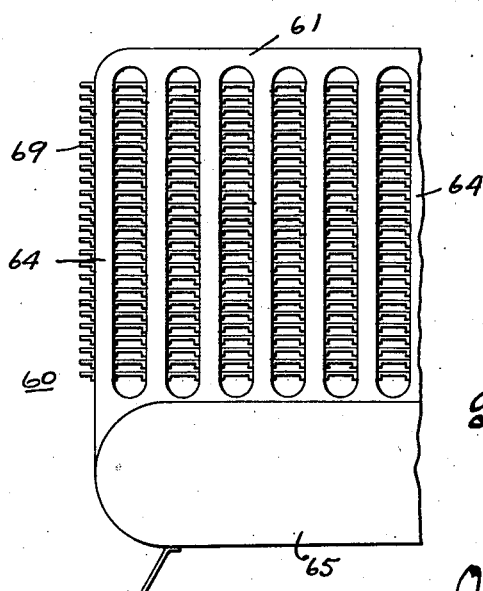
Fig. 20 is a fragmentary view of the completed condenser structure taken from the opposite side of Fig. 1.

The complete condenser structure, designated by reference character 60 and shown in Figs. 1, 2, and 20, is provided with an upper tubular header 61 which connects the upper ends of the vertical tubular portions 64 which are formed by the U-shaped portions 62 and 63. At the lower end of the vertical tubular portion 64 there is provided a large storage reservoir 65 which is formed of the semi-circular portions of the sheets 20 and 30. This storage reservoir forms a lower header which connects the lower portions of the parallel vertical tubular sections 64. The inlet for the condenser is provided by an aperture 66 which extends into the upper header 61 while the outlet for the condenser is provided by the aperture 67 which is provided in the boss 40 which extends from the cylindrical storage portion 65 of the condenser. The condenser is provided with a plurality of comb-shaped cross fins 69 provided with teeth 70 which extend between the parallel vertical tubular sections 64 and also provided with flanged grooves or slots 71 which receive the vertical tubular sections 64 and contact therewith. The condenser structure is supported by a plurality of brackets 72 which are bonded to the end portions of the cylindrical storage portion of the condenser structure.

With this condenser structure the hot refrigerant gas from the compressor enters the upper header 61 through the aperture 66 and is distributed laterally, entering the finned vertical tubular portions 64 of the condenser where it is cooled and liquefied. The refrigerant liquefied in each of the vertical tubular members is collected in the lower header or reservoir 65 from which it is drained by passing through the lower aperture 67 in the boss 40. This aperture 67 is located at a sufficiently low point so that the lower header or reservoir 65 is normally kept drained of liquid refrigerant. When the liquid discharge from the condenser is cut off as in a low-side float system or when a service valve or high side float valve is positively closed, the liquid refrigerant may back up into the large lower header or reservoir 65 which is provided with sufficient capacity to receive substantially all of the liquid refrigerant in the system. This permits the compressor unit to be operated until substantially all of the refrigerant is collected in the high side of the system without blocking off the effective portion of the condenser.

Figure 12:
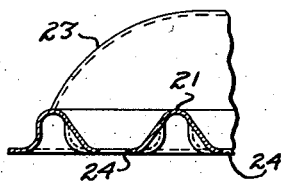
Fig. 12 is a fragmentary sectional view of a portion of the sheet on line 12—12 of Fig. 5.
Figure 13:
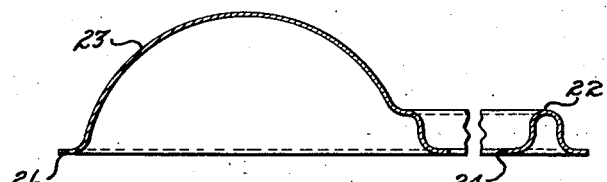
Fig. 13 is a vertical sectional view of the sheet on line 13—13 of Fig. 5.
Figure 14:
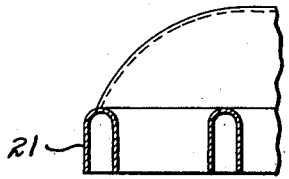
Fig. 14 is a sectional view of a portion of the sheet on line 14—14 of Fig. 6 after final drawing operation.
Figure 15:
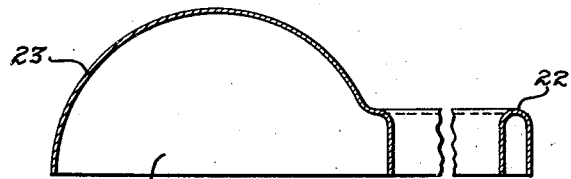
Fig. 15 is a vertical sectional view of a portion of the sheet on line 15—15 of Fig. 6.
Figure 3:
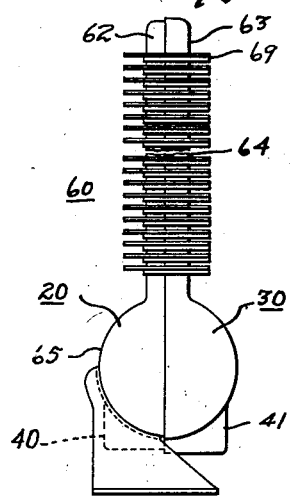
Fig. 3 is an end view of my condenser.

The heat transfer structure which is the subject of this invention has been so designed that it may be very economically made and assembled by punch press operations. In the beginning the manufacture of such a heat transfer structure, a flat sheet 20 of metal is taken and subjected to a first drawing operation which provides a plurality of parallel grooves 21 and a similar transverse groove 22 at one end of the parallel grooves 21 while at the other end of the parallel grooves there is provided a large, deep semi-circular groove 23 which provides one-half of the storage reservoir. After this first drawing operation the sheet 20 is subjected to a piercing and trimming operation which trims the edges of the sheet and which also pierces longitudinal slots 24 between the parallel grooves provided in the first drawing operation on the sheet as shown in Figs. 5, 12, 13, and 22. After this, the sheet 20 is subjected to a final drawing operation which forms it into shape as shown in Figs. 6, 14, and 15 which makes the parallel grooves 21, as well as the top transverse groove 22, into a deep U-shape in cross section. At this time the flanges 26 found in Figs. 5, 12, and 13 are bent in a direction perpendicular to the plane of the sheet and the semi-circular portion is drawn more deeply to provide a true semi-circular shape. The boss 40 is also formed during the first and second drawing operations.

Figure 21:
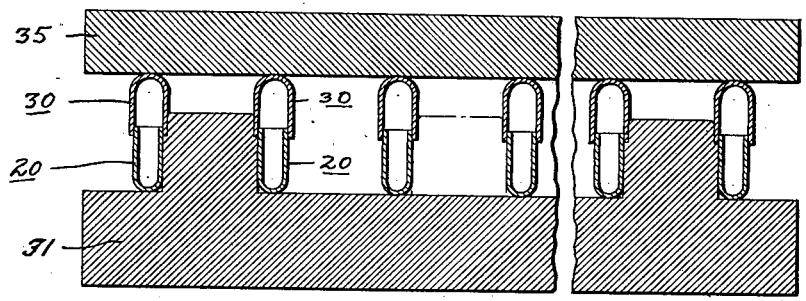
Fig. 21 is a sectional view through a die and a portion of the condenser structure showing the assembly of the two sheets of metal, and corresponds in point of view to Fig. 8.
Figure 23:
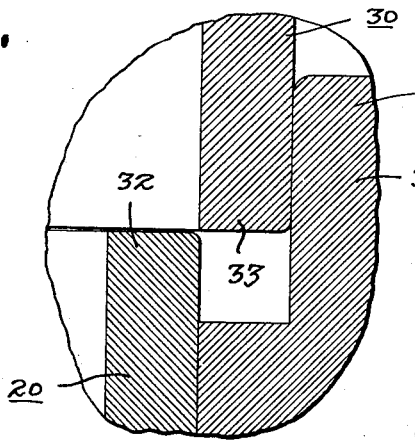
Fig. 23 is a fragmentary view showing the assembly of the two sheets of metal just prior to the view shown in Fig. 21.
Figure 22:
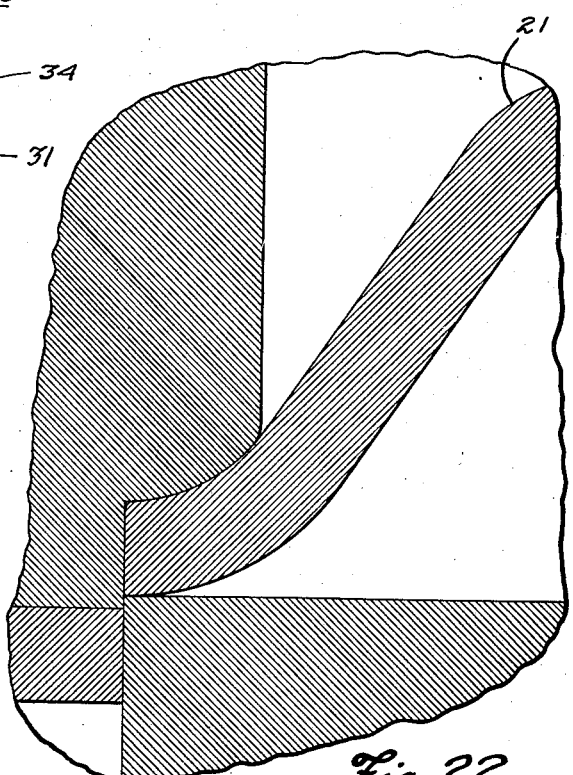
Fig. 22 is a fragmentary view showing the piercing operation referred to in connection with Figs. 5, 12, and 13.

In addition to the sheet 20, a second sheet 30 is made similar in form but the shell and grooves are made slightly wider so that they may telescope over the edges of the grooves of the sheet 20. A boss 41 is formed in this sheet during the drawing operations. In order to assemble the two similar pieces together, they are placed one on top of the other in a die as shown in Fig. 21. The sheet 20 is placed with its face upward on the lower section 31 of the die with its edges extending vertically upwardly as shown in Fig. 23 and on the sheet 20 there is laid a similar sheet 30 with its face downwardly and guided by the guiding portions 34 of the lower section 31 of the die, after which the upper section 35 of the die is brought down and presses the upper sheet or shell 30 over the lower sheet 20 so that the edges 32 of the lower sheet extend within the edges 33 of the upper sheet, thus telescoping the two sheets together.

During the drawing operations the semi-circular portions of each of the sheets 20 and 30 are each provided with a boss 40 and 41 respectively. These bosses are provided so that the liquid within the condenser structure may be drained easily and a suitable connection made therethrough.

Figure 16:
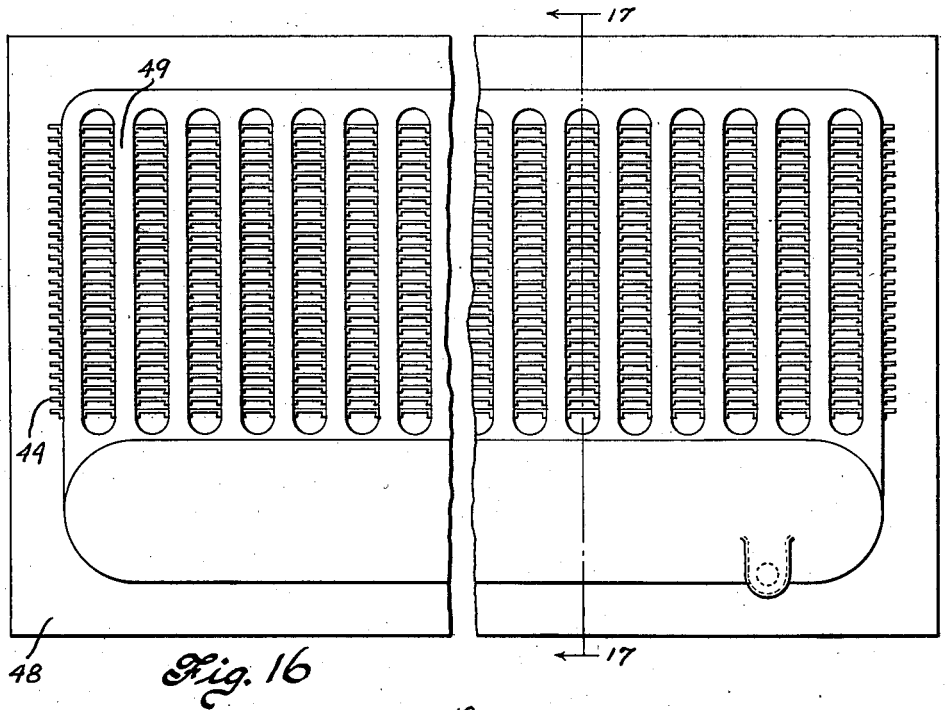
Fig. 16 is a plan view of the fins and the formed sheets of metal in a die ready for pressing the fins on the tubes.
Figure 17:
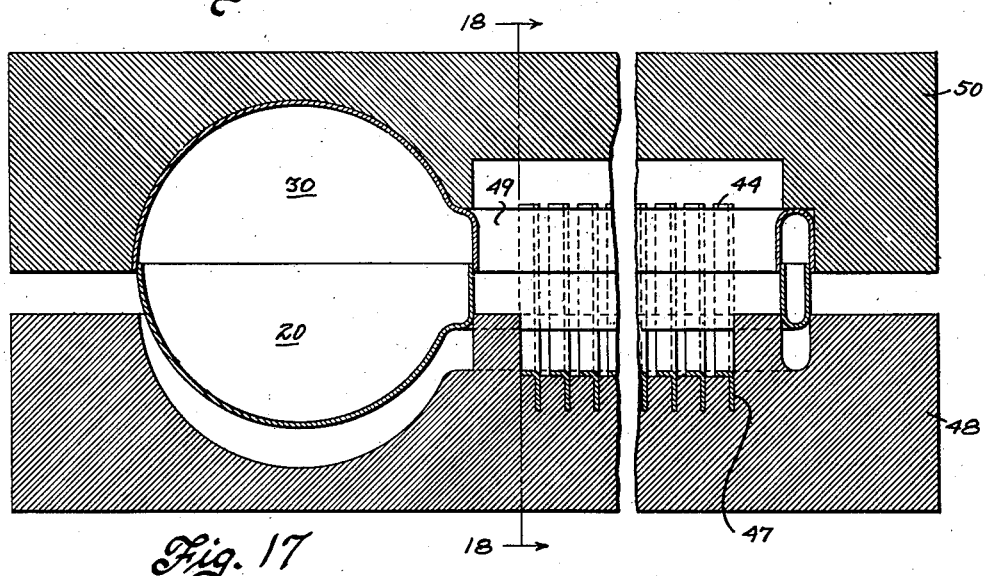
Fig. 17 is a sectional view along the line 17—17 of Fig. 16.
Figure 18:
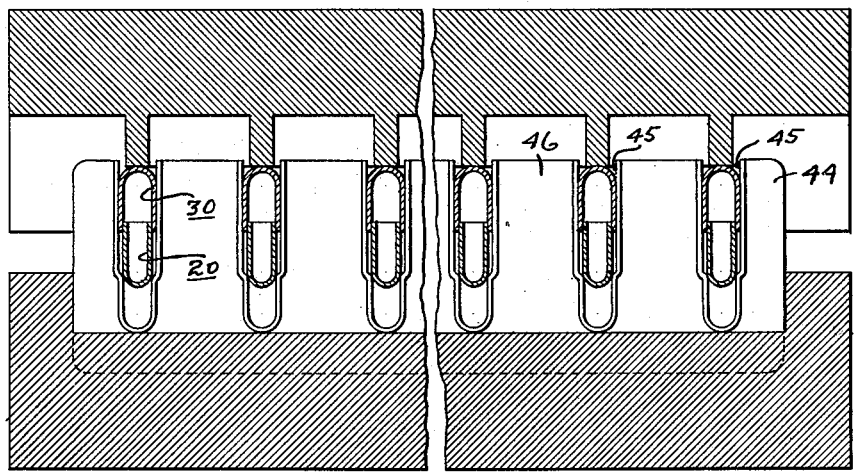
Fig. 18 is a sectional view along the line 18—18 of Fig. 17.
Figure 19:
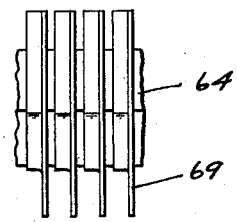
Fig. 19 is a fragmentary view showing a plurality of fins mounted on a tubular portion of the condenser.

Referring now more particularly to Figs. 16 to 18 inclusive, the fins 44, which have been cut and shaped to provide sort of a comb-shaped structure with flanged slots 45 between the teeth 46, are placed within locating recesses 47 within the lower section 48 of a die. After all of the fins have been set in their places in the lower section 48, the assembly consisting of the sheets 20 and 30 assembled together is placed on the lower section 48 of the die with the tubular portions 49 formed by grooves extending within the flanged slots 45 of the fins 44. After this, the section 50 of the die forces the tubular assembly of the sheets 20 and 30 upon the fins 44 and into the slots 45 thereof.

After the two sheets 20 and 30 have been so assembled to form a tubular structure and the fins so applied to the parallel tubular portions 49, the entire assembled structure is coated with a lacquer containing metallic copper dust and then the entire structure is placed within a furnace having a reducing atmosphere and heated to a temperature between 1900° and 2000° F. This causes the vaporization of the lacquer and the deposit of the metallic copper dust upon the surfaces of the sheets and particularly on the joints between the sheets 20 and 30 and the contacting portions of the fins on the tubular section 49 and this copper dust fuses within this furnace in the presence of the reducing atmosphere and seals the joints between the sheets 20 and 30 as well as bonds the fins to the parallel tubular portions. The brackets 72 are also fastened to the end portions of the condenser by this brazing operation. It has been found that this provides a remarkably good way to seal the portions of this assembled structure and to fasten the fins on to the tubular section. Instead of this process, the carbon brazing process may be used if desired or any other suitable bonding process.

It will therefore be seen that my improved condenser can be manufactured almost entirely through punch press operations performed upon sheet metal. This makes the product of high quality and low cost. By providing this form of condenser made up of a plurality of sheets of metal, I am able to provide a large storage reservoir portion within a condenser which provides storage capacity when it is desired to transfer the liquid through the high side portion of the system. I have found that the structure of my condenser provided with a plurality of parallel tubular members connected at their ends by headers which has the header 61 and the header 65 and provided with cross fins gives excellent heat transfer. The tubular sections 64 are relatively narrow and permit the air stream from the condenser fan to slip quietly through the condenser portion without causing excessive eddy currents. By my improved condenser construction I have provided an efficient heat transfer apparatus with an integral storage portion without additional expense.

While the form of embodiment of the invention as herein disclosed, constitutes a preferred form, it is to be understood that other forms might be adopted, all coming within the scope of the claims which follow.

What is claimed is as follows:

1. A heat transfer member comprising a pair of sheets of metal each having a plurality of parallel grooves, the grooves of one sheet being bulged in a direction opposite to the grooves of the other sheets, a groove at each end of each of the sheets extending transversely to the parallel grooves and connecting the end portions thereof, said sheets being pierced between the grooves to provide apertures between the parallel grooves, said sheets having their edge portions bonded together to provide a sealed enclosure.

2. A heat transfer member comprising a pair of sheets of metal each having a plurality of parallel grooves, the grooves of one sheet being bulged in a direction opposite to the grooves of the other sheets, a groove at each end of each of the sheets extending transversely to the parallel grooves and connecting the end portions thereof, said sheets being pierced between the grooves to provide apertures between the parallel grooves, said sheets having their edge portions extending in opposite directions and telescoping one another to provide a tubular enclosure of parallel tubes and headers.

3. A heat transfer member comprising a plurality of sheets of metal having U-shaped grooves formed therein, the grooves of one of the sheets facing the grooves of another of the sheets, the edges of the grooves of one of the sheets extending within and telescoping the edges of the grooves of another of the sheets.

4. A heat transfer member comprising a plurality of sheets of metal having U-shaped grooves formed therein, the grooves of one of the sheets facing the grooves of another of the sheets, the edges of the grooves of one of the sheets extending within and telescoping the edges of the grooves of another of the sheets, the adjacent edges of the grooves being bonded together to provide a sealed tubular member.

5. A heat transfer member comprising a plurality of sheets of metal having U-shaped grooves formed therein, the grooves of one of the sheets facing the grooves of another of the sheets, the edges of the grooves of one of the sheets extending within and telescoping the edges of the grooves of another of the sheets, the adjacent edges of the grooves being bonded together to provide a sealed tubular member and a plurality of cross-fins contacting with the outer surfaces of said grooves.

6. A refrigerator condenser comprising a pair of perforated complementary hollow sheet metal shells, each of said shells having a depression forming a refrigerant reservoir and other depressions forming a plurality of smaller refrigerant ducts at least one of which is in communication with said reservoir, said shells being pierced between adjacent depressions and assembled together at their edges to close said depressions, and refrigerant inlet and outlet connections for said condenser.

7. A refrigerant condenser comprising a pair of sheet metal members, at least one of said members having a depression forming a refrigerant reservoir and other depressions forming a refrigerant duct in communication with said reservoir, said members being pierced between adjacent depressions and assembled together at their edges to close said depressions and refrigerant inlet and outlet connections for said condenser.

8. A refrigerator condenser comprising a pair of sheet metal members, at least one of said members having a depression forming a refrigerant reservoir and other depressions forming a refrigerant duct in communication with said reservoir, said members being pierced between adjacent depressions and assembled together at their edges to close said depressions, refrigerant inlet and outlet connections for said condenser, and a plurality of cross fins extending through the pierced portions between adjacent refrigerant ducts.

9. A refrigerator condenser comprising a pair of perforated complementary hollow sheet metal shells, each of said shells having depressions forming a pair of headers and other depressions forming a plurality of refrigerant ducts in communication with said headers, said shells being pierced between adjacent depressions and assembled together at their edges to close said depressions, and refrigerant inlet and outlet connections for said condenser.

10. A refrigerant condenser comprising a pair of sheet metal members, at least one of said members having depressions forming a pair of headers and other depressions forming refrigerant ducts in communication with said headers, said members being pierced between adjacent depressions and assembled together at their edges to close said depressions and refrigerant inlet and outlet connections for said condenser.

11. A refrigerator condenser comprising a pair of sheet metal members, at least one of said members having depressions forming a pair of headers and other depressions forming refrigerant ducts in communication with said headers, said members being pierced between adjacent depressions and assembled together at their edges to close said depressions, refrigerant inlet and outlet connections for said condenser, and a plurality of cross fins extending through the pierced portions between adjacent refrigerant ducts.

12. A heat exchange unit comprising a pair of sheet metal members, each of said members having a plurality of depressions formed therein and being perforated between certain of the depressions, said members being assembled to one another in opposed relation and having their edges secured together about said depressions to form closed fluid circulating ducts within said unit, the perforations in said members providing air passages through said unit, and fluid inlet and outlet connections for the unit.

13. A heat exchange unit comprising a pair of sheet metal members, each of said members having a plurality of depressions formed therein and being perforated between certain of the depressions, said members being assembled to one another in opposed relation and having their edges secured together about said depressions to form closed fluid circulating ducts within said unit, the perforations in said members providing air passages through said unit and the depressions in said members being of such form as to elongate the closed fluid circulating ducts in the direction of flow of air through said passages, and fluid inlet and outlet connections for the unit.

14. A condenser for a refrigerating system comprising, a heat exchange portion, and a storage portion in communication with the heat exchange portion, both of said portions being formed by a pair of sheet metal members provided with oppositely facing concavities having their edges telescoped together and sealed.

15. A condenser for a refrigerating system comprising, a heat exchange portion including a plurality of conduits connected in parallel, and a storage portion communicating with the conduits of the heat exchange portion, both of said portions being formed by a pair of sheet metal members provided with oppositely facing concavities having their edges telescoped together and sealed.

JAMES R. STEPHENSON.